(12) United States Patent
Li et al.

(10) Patent No.: US 8,293,437 B2
(45) Date of Patent: Oct. 23, 2012

(54) LIGHT SHADING STRUCTURE, AND COLOR FILTER SUBSTRATE, ACTIVE DEVICE ARRAY SUBSTRATE, LIQUID CRYSTAL DISPLAY PANEL THEREOF

(75) Inventors: De-Jiun Li, Taipei County (TW); Kuo-Ching Chou, Taipei County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 338 days.

(21) Appl. No.: 12/723,691

(22) Filed: Mar. 15, 2010

(65) Prior Publication Data

US 2010/0165272 A1 Jul. 1, 2010

Related U.S. Application Data

(62) Division of application No. 11/309,001, filed on Jun. 7, 2006, now Pat. No. 7,713,596.

(51) Int. Cl.
*G02F 1/1335* (2006.01)
*G02B 5/20* (2006.01)

(52) U.S. Cl. ............................................. 430/7; 349/106
(58) Field of Classification Search ........................ None
See application file for complete search history.

(56) References Cited

U.S. PATENT DOCUMENTS 5,844,645 A * 12/1998 Kashimoto ................... 349/106
2005/0147899 A1* 7/2005 Sun et al. ........................... 430/7

FOREIGN PATENT DOCUMENTS

JP 11-064837 A * 3/1999

OTHER PUBLICATIONS

Computer-generated translation of JP 11-064837 (Mar. 1999).*

\* cited by examiner

*Primary Examiner* — John A. McPherson
(74) *Attorney, Agent, or Firm* — Jianq Chyun IP Office

(57) ABSTRACT

A color filter substrate including a substrate, a light shading structure, and a plurality of color filter units is provided. The substrate has a display region and a non-display region. The light shading structure disposed on the substrate includes a black matrix layer and a light shading layer, wherein the black matrix layer is disposed on the substrate and defines a plurality of sub-pixel regions in the display region, and covers the non-display region adjacent to the edge of the display region; the light shading layer is disposed on the black matrix layer of the non-display region adjacent to the edge of the display region and has at least one channel. The color filter units are correspondingly disposed in the sub-pixel regions.

13 Claims, 6 Drawing Sheets

LIGHT SHADING STRUCTURE, AND COLOR FILTER SUBSTRATE, ACTIVE DEVICE ARRAY SUBSTRATE, LIQUID CRYSTAL DISPLAY PANEL THEREOF

CROSS-REFERENCE TO RELATED APPLICATION

This application is a divisional application of and claims priority benefit of an application Ser. No. 11/309,001, filed on Jun. 7, 2006, now allowed. The entirety of the above-mentioned patent application is hereby incorporated by reference herein and made a part of this specification.

BACKGROUND OF THE INVENTION

1. Field of Invention

The invention relates to a light shading structure, a filter substrate, an array substrate, and a display panel, and more particularly, to a light shading structure used to solve the problem of light leakage and having a function of liquid crystal flow guidance, and a color filter substrate, an active device array substrate, and an LCD panel having the light shading structure.

2. Description of Related Art

With the development of photoelectric techniques and semiconductor manufacturing techniques, the flat panel display with the advantages of being thin and light has gradually matured. Among flat panel displays, such as Liquid Crystal Displays (LCDs), Organic Electro-Luminescence Displays (OELDs), and Plasma Display Panels (PDPs), the LCD with advantages of high definition, high space utilization efficiency, low power consumption, and non-radiation has gradually become the market mainstream.

Generally, an LCD is composed of an LCD panel and a backlight module, wherein the LCD panel includes an active device array substrate, a color filter substrate, and a liquid crystal layer sandwiched there-between. And full color effects can be achieved by the color filter substrate.

FIG. 1 is a schematic view of a conventional color filter substrate. Referring to FIG. 1, the color filter substrate 100 mainly includes a substrate 102, black matrixes 104a, 104b, a plurality of color filter units 106, and a common electrode 108. The substrate 102 can be divided into a display region 102a and a non-display region 102b surrounding the periphery of the display region 102a. The black matrixes 104a, 104b are disposed on the substrate 102, wherein the black matrix 104a defines a plurality of sub-pixel regions 110 in the display region 102a; the black matrix 104b covers the non-display region 102b adjacent to the edge of the display region 102a. The color filter units 106 are respectively formed by a plurality of photoresists with different colors (e.g., red photoresist, green photoresist, and blue photoresist, etc.) through exposure, development, and other processes, and are correspondingly disposed in the sub-pixel regions 110 defined by the black matrixes 104. Moreover, a common electrode 108 is disposed on the surface of the black matrixes 104a, 104b, and the color filter units 106.

Referring to FIG. 1 again, the main function of the black matrix 104a of the display region 102a is to separate emergent lights with different colors, so as to increase the color contrast and the color purity when displaying. Moreover, the black matrix 104b covering the non-display region 102b adjacent to the edge of the display region 102a is used to avoid light leakage through the non-display region 102b.

In the early days, black matrixes 104a, 104b were usually made of Chromium (Cr), such that the black matrixes 104a, 104b made of Cr have preferred light shading effects. However, since Cr causes environmental pollution, it has gradually been forbidden for use. Considering environmental protection, using green materials has currently become the main trend. Therefore, in the current processes, resin is used to replace Cr in most cases.

However, using resin will cause another problem. Since the light shading effect of resin is weaker than that of Cr, part of the light will still penetrate through the black matrix 104b of the non-display region 102b and leak to the outside, so as to result in light leakage at the non-display region 102b adjacent to the display region 102a. Particularly with the development of LCD panels of high brightness and large size, the above light leakage phenomenon will be more severe in LCD devices with a high-brightness backlight module.

Further, when the above color filter substrate 100 is used for manufacturing an LCD panel (not shown), the liquid crystal (not shown) is disposed on the color filter substrate 100, and then, a sealant (not shown) is used to adhere the color filter substrate 100 and the active device array substrate (not shown) together. The liquid crystal may flow to the location of the sealant, and if the liquid crystal is in contact with the un-solidified sealant, it will be contaminated and the quality of the LCD panel will be deteriorated.

SUMMARY OF THE INVENTION

In view of the above, the invention provides a light shading structure, which can solve the light leakage problem of the liquid crystal display (LCD) panel at the edge of the display region, preventing the liquid crystal from being contaminated by the sealant.

The invention also provides a color filter substrate, which can solve the light leakage problem of the LCD panel with a color filter substrate.

The invention further provides an active device array substrate, which can solve the light leakage problem of the LCD panel with an active device array substrate.

The invention additionally provides an LCD panel, which can solve the light leakage problem at the edge of the display region and prevent the liquid crystal from being contaminated by the sealant.

Accordingly, a light shading structure suitable for being disposed on a substrate is provided, which has a display and a non-display region. The light shading structure includes a black matrix layer and a light shading layer. The black matrix layer is disposed on the substrate and defines a plurality of sub-pixel regions in the display region. The black matrix layer also covers the non-display region adjacent to the edge of the display region. The light shading layer is disposed on the black matrix layer of the non-display region adjacent to the edge of the display region and has at least one channel.

As for the light shading structure in an embodiment of the invention, the material of the light shading structure is selected from the group consisting of red photoresist, green photoresist, blue photoresist and a combination thereof.

As for the light shading structure in an embodiment of the invention, the material of the black matrix layer includes resin.

As for the light shading structure in an embodiment of the invention, the light shading layer includes a first light shading layer, a second light shading layer, and a third light shading layer, wherein the second light shading layer is disposed on the first light shading layer; the third light shading layer is disposed on the second light shading layer.

The invention further provides a color filter substrate, which includes a substrate, a light shading structure, and a plurality of color filter units. The substrate has a display region and a non-display region. The light shading structure disposed on the substrate includes a black matrix layer and a light shading layer, wherein the black matrix layer is disposed on the substrate and defines a plurality of sub-pixel regions in the display region, and covers the non-display region adjacent to the edge of the display region; the light shading layer is disposed on the black matrix layer of the non-display region adjacent to the edge of the display region and has at least one channel. The color filter units are correspondingly disposed in the sub-pixel regions.

As for the color filter substrate in an embodiment of the invention, the light shading layer has at least one channel disposed in the light shading layer.

As for the color filter substrate in an embodiment of the invention, the material of the light shading layer is selected from the group consisting of red photoresist, green photoresist, blue photoresist and a combination thereof.

As for the color filter substrate in an embodiment of the invention, the material of the black matrix layer includes resin.

As for the color filter substrate in an embodiment of the invention, the light shading layer includes a first light shading layer, a second light shading layer, and a third light shading layer, wherein the second light shading layer is disposed on the first light shading layer; the third light shading layer is disposed on the second light shading layer.

As for the color filter substrate in an embodiment of the invention, a common electrode is further included to be disposed on parts of the light shading structure and the color filter units.

The invention further provides an active device array substrate, which includes a substrate, a plurality of scan lines, a plurality of data lines, a plurality of active devices, a plurality of pixel electrodes, a light shading structure, and a plurality of color filter units. The substrate has a display region and a non-display region. The scan lines and the data lines are disposed in the display region. The active devices are disposed in the display region on the substrate, and each active device is electrically connected with the above scan lines and the data lines. The pixel electrodes are disposed in the display region on the substrate, and each pixel electrode is respectively electrically connected with one of the above active devices. The light shading structure is disposed on the substrate and includes a black matrix layer and a light shading layer, wherein the black matrix layer is disposed on the substrate and defines a plurality of sub-pixel regions in the display region, and covers the non-display region adjacent to the edge of the display region; the light shading layer is disposed on the black matrix layer of the non-display region adjacent to the edge of the display region and has at least one channel. The color filter units are correspondingly disposed in the sub-pixel regions.

As for the active device array substrate in an embodiment of the invention, the light shading layer further includes at least one channel disposed in the light shading layer.

As for the active device array substrate in an embodiment of the invention, the material of the light shading layer is selected from the group consisting of red photoresist, green photoresist, blue photoresist and a combination thereof.

As for the active device array substrate in an embodiment of the invention, the material of the black matrix layer includes resin.

As for the active device array substrate in an embodiment of the invention, the light shading layer includes a first light shading layer, a second light shading layer, and a third light shading layer, wherein the second light shading layer is disposed on the first light shading layer; the third light shading layer is disposed on the second light shading layer.

The invention further provides an LCD panel, which includes a color filter substrate mentioned above, an active device array substrate, and a liquid crystal layer, wherein the liquid crystal layer is sandwiched between the color filter substrate and the active device array substrate.

As for the LCD panel in an embodiment of the invention, a sealant is further included, which is located between the color filter substrate and the active device array substrate, and surrounds the light shading structure. Moreover, the light shading layer has at least one channel disposed in the light shading layer.

The invention further provides an LCD panel, which includes an active device array substrate mentioned above, an opposite substrate, and a liquid crystal layer, wherein the liquid crystal layer is sandwiched between the active device array substrate and the opposite substrate.

As for the LCD panel in an embodiment of the invention, a sealant is further included, which is located between the active device array substrate and the opposite substrate, and surrounds the light shading structure. Moreover, the light shading layer has at least one channel disposed in the light shading layer.

In the light shading structure provided by the invention, the light shading layer is disposed on the black matrix layer of the non-display region adjacent to the edge of the display region, so as to improve the light shading effect of the non-display region. The light shading structure can be applied to the color filter substrate or the active device array substrate with a color filter array layer on the array substrate (Color filter on Array, COA). The LCD panel manufactured with the color filter substrate or the active device array substrate in the form of COA will alleviate the light leakage at the edge of the display region. Moreover, the light shading layer has at least one channel, such that during the manufacturing processes of the LCD panel, the flow speed of the liquid crystal will be slowed down by the channel, so as to avoid the contamination caused by the contact of liquid crystal and un-solidified sealant.

In order to make aforementioned and other features and advantages of the invention comprehensible, an embodiment accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
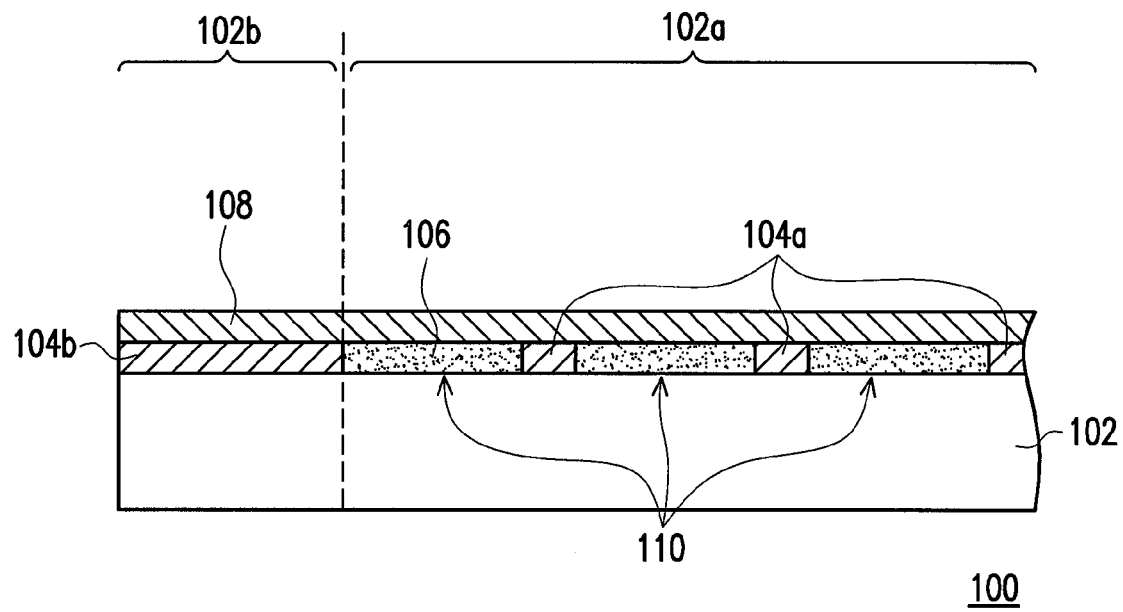
FIG. 1 is a schematic view of a conventional color filter substrate.
Figure 2:
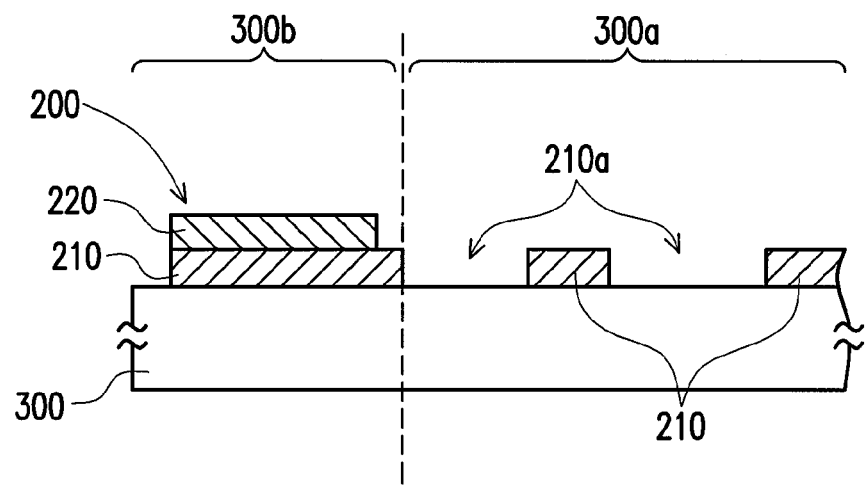
FIG. 2 is a schematic cross-sectional view of a light shading structure according to an embodiment of the invention.
Figure 2A:
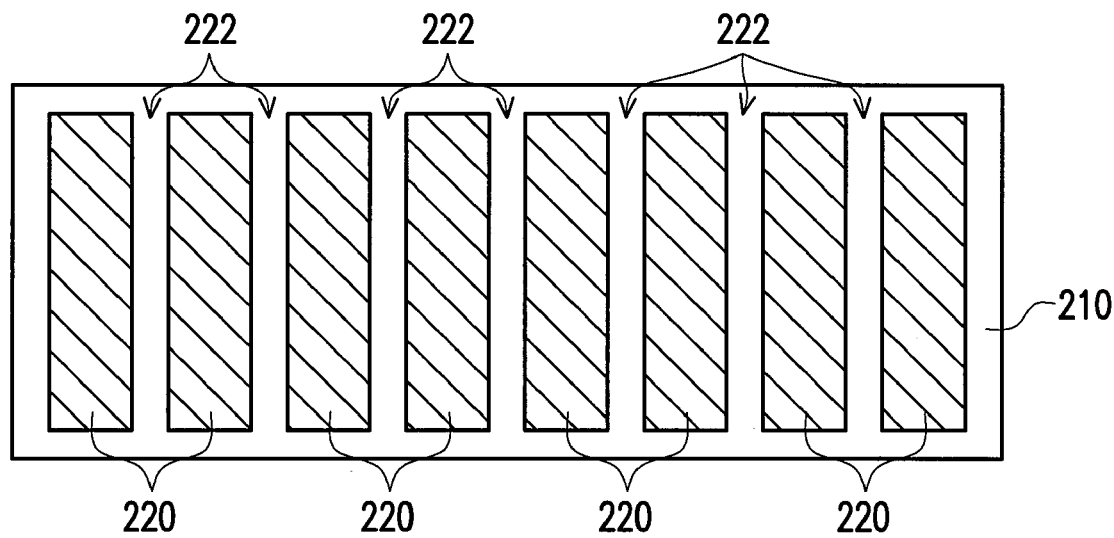
FIGS. 2A-2C are schematic top views of the channel for the light shading structure of FIG. 2.
Figure 2B:
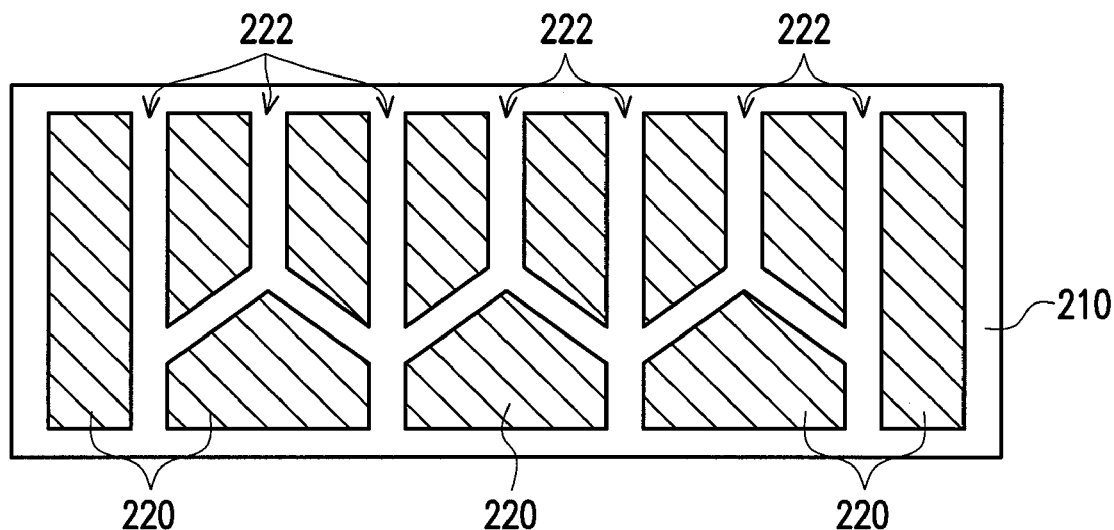
Figure 2C:
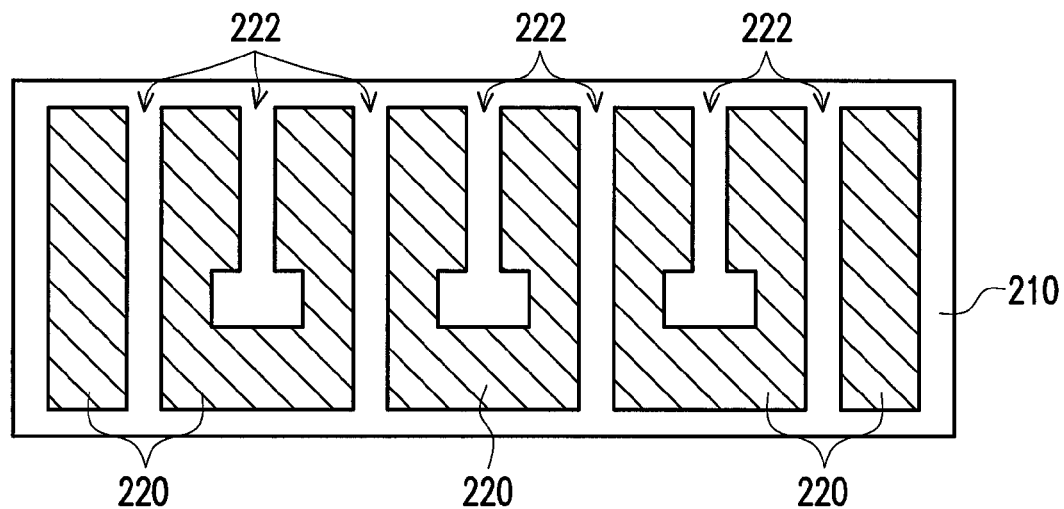

FIG. 2 is a schematic cross-sectional view of a light shading structure according to an embodiment of the invention. FIGS. 2A-2C are schematic top views of the channels of the light shading structure of FIG. 2. Referring to FIG. 2 and FIGS. 2A-2C, a light shading structure 200 is disposed on a substrate 300. The substrate 300 has a display region 300a and a non-display region 300b. The light shading structure 200 includes a black matrix layer 210 and a light shading layer 220, wherein the black matrix layer 210 is disposed on the substrate 300 and defines a plurality of sub-pixel regions 210a in the display region 300a, and covers the non-display region 300b adjacent to the edge of the display region 300a; the light shading layer 220 is disposed on the black matrix layer 210 of the non-display region 300b adjacent to the edge of the display region 300a, and the light shading layer 220 has at least one channel 222.

Referring to FIG. 2 again, in an embodiment, the material of the substrate 300 is, for example, glass, quartz, or flexible material. Moreover, the material of the black matrix layer 210 is, for example, resin or another suitable material, which meets the requirements of environmental protection. It should be noted that the light shading layer 220 is disposed on the black matrix layer 210 of the non-display region 300b adjacent to the edge of the display region 300a, so as to enhance the light shading effect of the non-display region 300a, that is, the optical density of the black matrix layer 210 with the light shading layer 220 disposed in the non-display region 300b can be larger than 4.8. Moreover, in an embodiment, the material of the light shading layer 220 is, for example, selected from the group consisting of red photoresist, green photoresist, blue photoresist and a combination thereof.

Particularly, the light shading layer 220 of the light shading structure 200 has a channel 222 with a pattern as shown in FIGS. 2A-2C. The pattern of the channel 222 is not restricted in the invention. The function of the channel 222 is described below. During the process for manufacturing the LCD panel, since the flow guiding effects of the channel 222 can slow down the flow speed of the liquid crystal, the contamination caused by the contact of liquid crystal and un-solidified sealant (not shown) can be avoided.

In the above light shading structure 200, the light shading layer 220 is a single-layer film. However, the light shading layer 220 is not limited to be a single-layer film. In the following embodiments, the light shading layer can be a multi-layer film with two or more than three layers. Not only can the light shading effect be preferably improved, but during the process for manufacturing the LCD panel, the flow speed of the liquid crystal also can be slowed down effectively.

Figure 3:
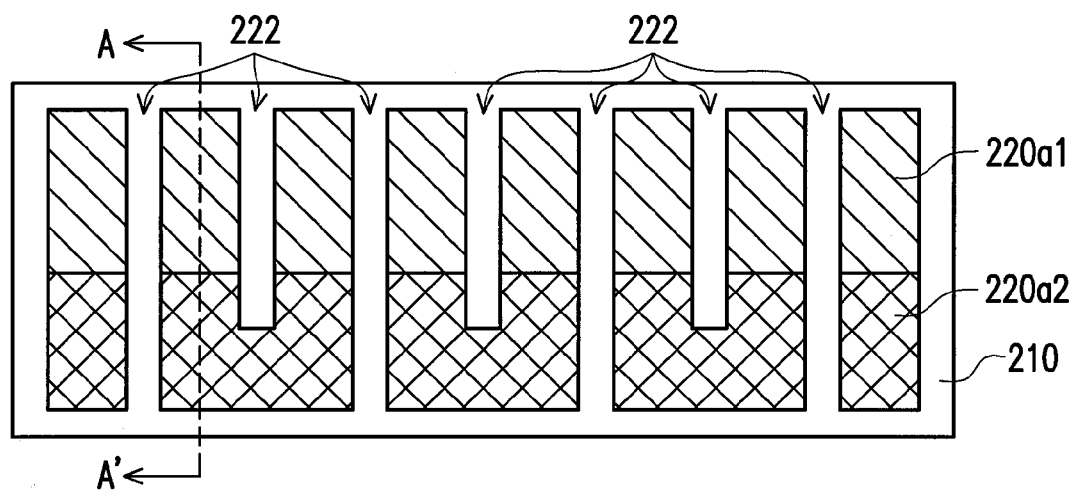
FIG. 3 is a schematic top view of a light shading structure according to another embodiment of the invention.
Figure 3A:
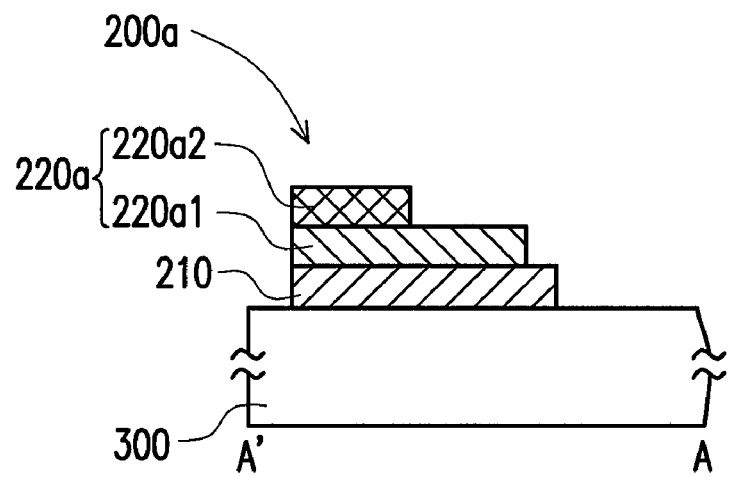
FIG. 3A is a schematic cross-sectional view of FIG. 3 along the line of A-A'.

FIG. 3 is a top schematic view of a light shading structure of another embodiment of the invention. FIG. 3A is a schematic cross-sectional view of FIG. 3 along the line of A-A'. Referring to FIG. 3 and FIG. 3A, the light shading structure 200a is similar to the above light shading structure 200 with the difference lying in that the light shading layer 200a in FIG. 3 includes a first light shading layer 200a1 and a second light shading layer 200a2. It should be noted that there are a plurality of channels 222 in the light shading structure 200a. Therefore, the light shading structure 200a with more than two light shading layers 200a1, 220a2 can be used to improve the light shading effect, and during the process for manufacturing the LCD panel, the flow speed of the liquid crystal can be slowed down by utilizing the flow guiding effect of the channel 222 and the slope, as shown in FIG. 3A, formed by stacking a plurality of light shading layers. Therefore, it takes the liquid crystal a longer time to flow to the sealant (not shown), and the liquid crystal can be prevented from being contaminated by the un-solidified sealant.

Figure 4:
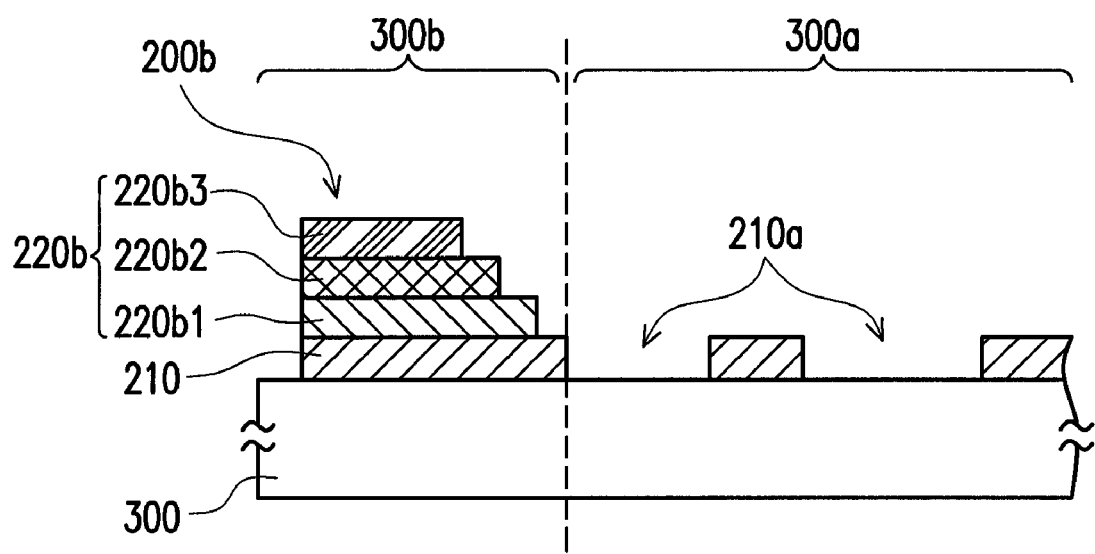
FIG. 4 is a schematic cross-sectional view of a light shading structure according to another embodiment of the invention.

FIG. 4 is a schematic cross-sectional view of a light shading structure according to another embodiment of the invention. Referring to FIG. 4, the light shading structure 200b, similar to the above light shading structures 200, 200a, has the channel 222 as shown in FIGS. 2A-2C, and FIG. 3, with the difference lying in that the light shading layer 220b as shown in FIG. 4 includes a first light shading layer 220b1, a second light shading layer 220b2, and a third light shading layer 220b3. The second light shading layer 220b2 is disposed on the first light shading layer 220b1. The third light shading layer 220b3 is disposed on the second light shading layer 220b2. Thereby, the light shading effect of the light shading structure 200b can be preferably improved, and the flow speed of the liquid crystal can be slowed down.

In view of the above, in this embodiment, the material of the first light shading layer 220b1 is, for example, red photoresist; the material of the second light shading layer 220b2 is, for example, green photoresist; and the material of the third light shading layer 220b3 is, for example, blue photoresist. Since the first light shading layer 220b1, the second light shading layer 220b2, and the third light shading layer 220b3 respectively employ three photoresists with different colors, no matter what the color of the light leaking from the black matrix layer 210 at the edge of the display region 300a, the light can be shaded by the light shading layer 220b. Of course, the materials of the first light shading layer 220b1, the second light shading layer 220b2, and the third light shading layer 220b3 can be selected from red photoresist, green photoresist, or blue photoresist as desired. It is not limited that the first light shading layer 220b1 must be a red photoresist, the second light shading layer 220b2 must be a green photoresist, and the third light shading layer 220b3 must be a blue photoresist.

It should be noted that the light shading structures 200, 200a, 200b can be applied in the components of the LCD panel, for example, color filter substrate or active device array substrate in the form of COA. The light shading structures 200, 200a, 200b can be used to avoid the light leakage at the edge of the display region of the LCD panel, and prevent the contamination caused by the contact of liquid crystal and un-solidified sealant. The structures and advantages of a color filter substrate, an active device array substrate, and an LCD panel having the light shading structure 200b will be described below, taking the light shading structure 200b as an example.

Figure 5:
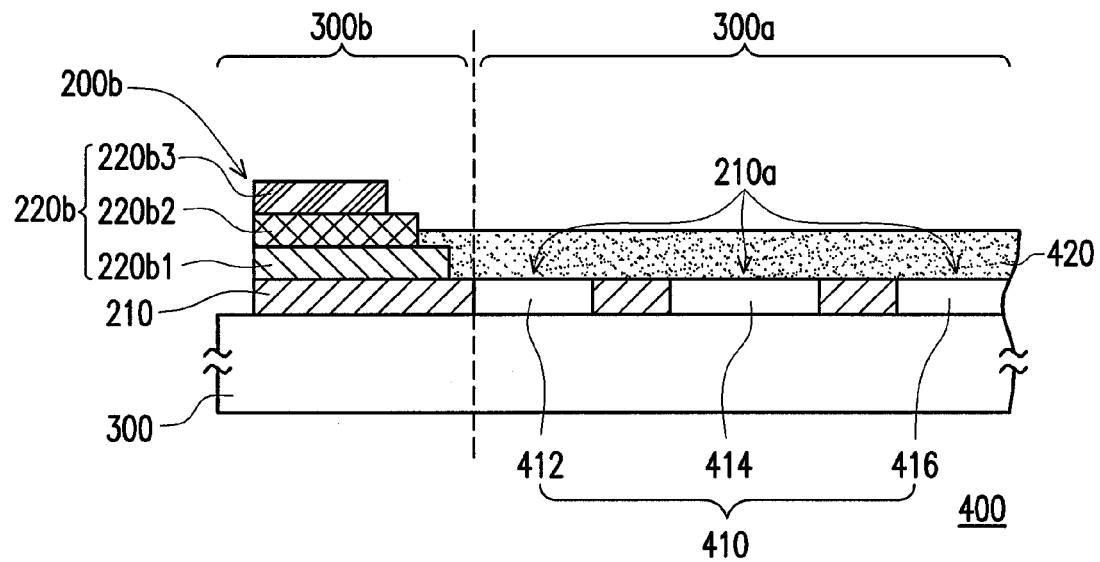
FIG. 5 is a schematic cross-sectional view of a color filter substrate according to an embodiment of the invention.

FIG. 5 is a schematic cross-sectional view of a color filter substrate of an embodiment of the invention. Referring to FIG. 5, a color filter substrate 400 includes a substrate 300, a light shading structure 200b, and a plurality of color filter units 410, wherein the light shading structure 200b is just the light shading structure 200b shown in FIG. 4, and can also be the light shading structures 200, 200a shown in FIG. 2 and FIG. 3A, thus, the detailed structure will not be described again herein. The color filter units 410 are correspondingly disposed in the sub-pixel regions 210a.

It should be noted that as for the color filter substrate 400, the light shading layer 220b is disposed on the black matrix 210 in the non-display region 300b, such that the light shading effect of the color filter substrate 400 at the non-display region 300b can be improved.

Further, in an embodiment, the light shading structure 200b of the color filter substrate 400 can include at least one channel 222 disposed in the light shading layer 220b. The pattern of the channel 222 can be the one shown in FIGS. 2A-2C, and FIG. 3, and other patterns also can be used as desired.

The materials of the substrate 300, the black matrix 210, and the light shading layer 220b of the invention are the same as that mentioned above, which will not be described again herein. It should be noted that the color filter unit 410 includes, for example, a red filter unit 412, a green filter unit 414, and a blue filter unit 416, with the materials being respectively red photoresist, green photoresist, and blue photoresist, which are the same as that of the light shading layer 220b. That is to say, the light shading layer 220b as shown in FIG. 5 is manufactured through the process for manufacturing the color filter unit 410 also.

More specifically, when the red filter unit 412, the green filter unit 414, and the blue filter unit 416 are formed respectively, the first light shading layer 220b1, the second light shading layer 220b2, and the third light shading layer 220b3 are meanwhile stacked in sequence on the black matrix 210 in the non-display region 300b, so as to form the light shading layer 220b. Therefore, additional processing devices or masks are not required for manufacturing the light shading layer 220b, so the manufacturing cost will not increase. Moreover, the combining sequence of the first light shading layer 220b1, the second light shading layer 220b2, and the third light shading layer 220b3 can be varied depending on the forming sequence of the color filter unit 410 or the design of the mask, and it is not limited that the light shading layers must be formed at the same time with the color filter unit 410.

Referring to FIG. 5, the color filter substrate 400 further includes a common electrode 420 disposed on parts of the light shading structure 200b and the color filter unit 410. In an embodiment, the material of the common electrode 420 can be indium tin oxide (ITO), indium zinc oxide (IZO), or another transparent conducting material. Through using the color filter substrate 400 as shown in FIG. 5, the LCD panel 500 that will be described below can be manufactured.

Figure 6:
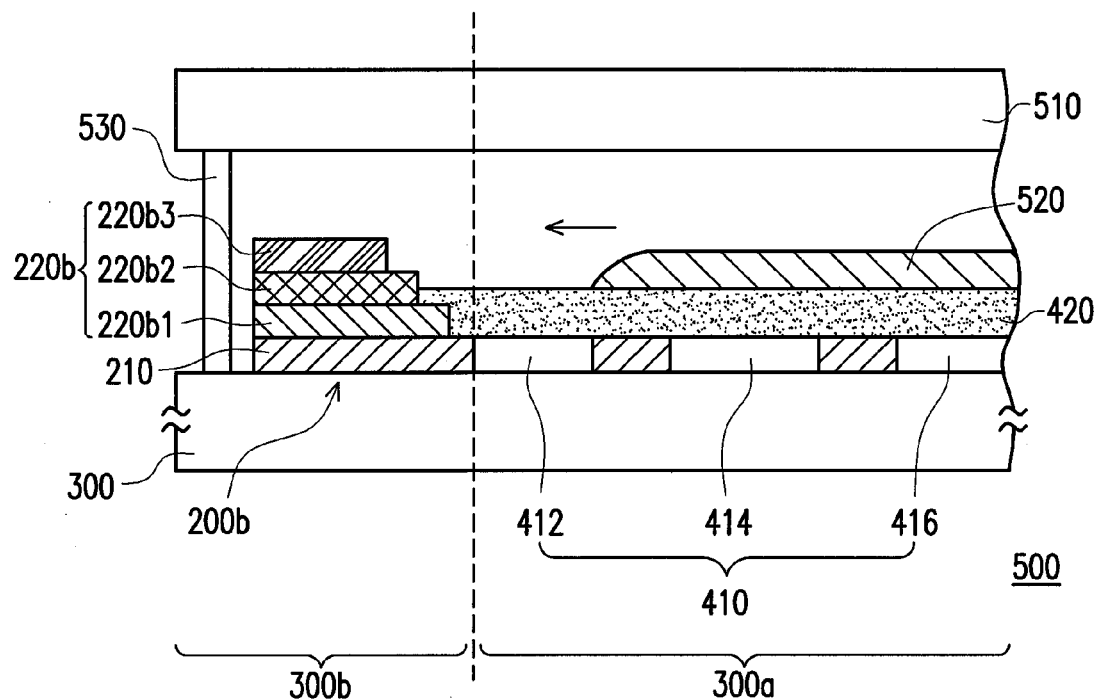
FIG. 6 is a schematic cross-sectional view of an LCD panel according to an embodiment of the invention.

FIG. 6 is a schematic cross-sectional view of an LCD panel according to an embodiment of the invention. Referring to FIG. 6, the LCD panel 500 includes the color filter substrate 400, an active device array substrate 510, and a liquid crystal layer 520, wherein the liquid crystal layer 520 is sandwiched between the color filter substrate 400 and the active device array substrate 510.

In an embodiment, the LCD panel 500 includes a sealant 530 disposed between the color filter substrate 400 and the active device array substrate 510 and surrounding the light shading structure 200b. Particularly, the light shading structure 200b has at least one channel 222, shown in FIGS. 2A-2C, and FIG. 3.

In the process for forming the LCD panel 500, the color filter substrate 400 will be disposed with the sealant 530, and injected with liquid crystals to form the liquid crystal layer 520, and combined with the active device array substrate 510, such that the LCD panel 500 is obtained. After injecting liquid crystals onto the color filter substrate 400, the liquid crystals will gradually diffuse and part of the liquid crystals will flow towards the direction of the arrow as shown in FIG. 6. It should be noted that since the light shading structure 200b has a plurality of channels 222, shown in FIGS. 2A-2C, and FIG. 3, when the liquid crystals flow to the light shading structure 200b, they will be guided into the channels 222, such that it will take a longer time for the liquid crystals to flow to the sealant 530.

Moreover, since the light shading structure 200b is a multilayer film, the flowing of the liquid crystals will be hindered through utilizing the slope of the light shading structure 200b, thereby prolonging the time taken by the liquid crystals to flow to the sealant 530. In this manner, by the time the liquid crystals are in contact with the sealant 530, the sealant 530 has already solidified. Therefore, the contamination caused by the contact of the liquid crystals and the un-solidified sealant 530 can be avoided. And the LCD panel 500 with the light shading structure 200b can be used to reduce the light leakage at the edge of the display region 300a.

Figure 7:
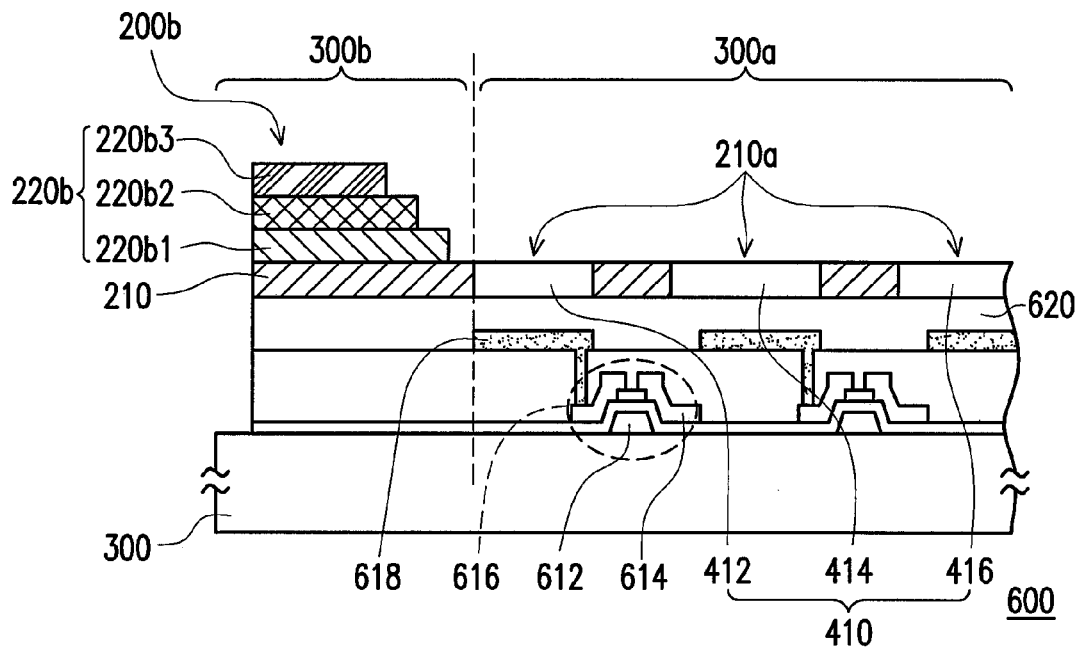
FIG. 7 is a schematic cross-sectional view of an active device array substrate according to an embodiment of the invention.

Similarly, the above light shading structure 200b also can be used to manufacture the active device array substrate in the form of COA. FIG. 7 is a schematic cross-sectional view of an active device array substrate according to an embodiment of the invention. Referring to FIG. 7, an active device array substrate 600 includes a substrate 300, a plurality of scan lines 612, a plurality of data lines 614, a plurality of active devices 616, a plurality of pixel electrodes 618, the above light shading structure 200b, and a plurality of color filter units 410. The substrate 300 is the same as the one described above. The scan lines 612 and the data lines 614 are disposed in the display region 300a. The active devices 616 are disposed in the display region 300a on the substrate 300, wherein each active device 616 is electrically connected with the scan lines 612 and the data lines 614. The pixel electrodes 618 are disposed in the display region 300a on the substrate 300, wherein each pixel electrode 618 is respectively electrically connected with the active devices 616. The light shading structure 200b, with the same construction as that described above, is disposed above the substrate 300. The color filter units 410 are correspondingly disposed in the plurality of sub-pixel regions 210a defined by the black matrix 210 in the display region 300a.

In view of the above, the materials of the substrate 300, the light shading layer 220b, and the color filter units 410 are the same as that described above. The materials of the scan lines 612 and the data lines 614 can be one of Al, Cr, Al alloy, Cr alloy, and combinations thereof or another suitable electrical conducting material. The active devices 616 are, for example, thin film transistors or other switching elements with three terminals. The material of the pixel electrodes 618 can be one of ITO, IZO, metal, and combinations thereof or another suitable material. The material of the black matrix layer 210 is, for example, resin or another suitable material.

It should be noted that the color filter units 410 and the light shading structure 200b are disposed on the active device array substrate 600, i.e., the active device array substrate 600 employs the structure of color filter on array (COA). Therefore, the active device array substrate 600 itself has the filtering function. Moreover, referring to FIG. 7, the active device array substrate 600 is provided with a flat layer 620, so that the above color filter units 410 and the light shading structure 200b can be disposed on the flat layer 620.

Moreover, in an embodiment, the light shading structure 200b of the active device array substrate 600 can include at least one channel 222 disposed in the light shading layer 220b. The pattern of the channel 222 may be the one shown in FIGS. 2A-2C, and FIG. 3, but other patterns also can be used as desired. Similarly, through the active device array substrate 600 shown in FIG. 7, the LCD panel 700 that will be described below can be manufactured.

Figure 8:
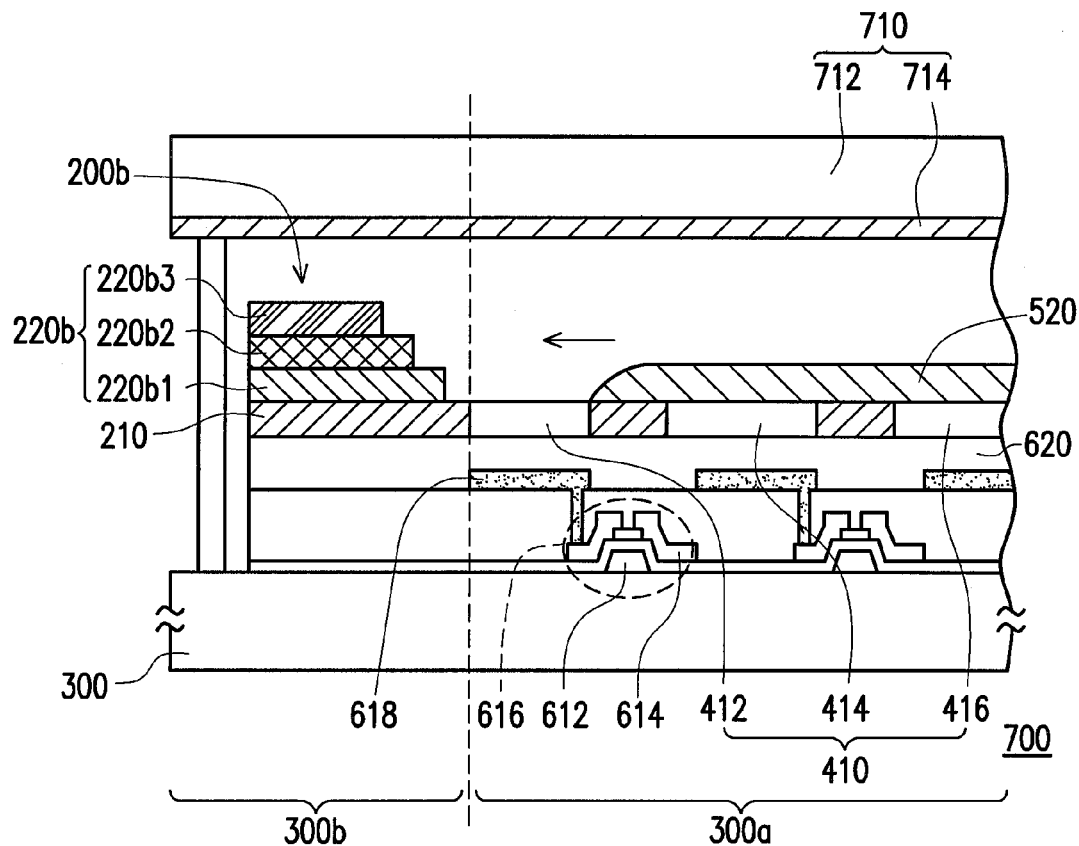
FIG. 8 is a schematic cross-sectional view of an LCD panel according to another embodiment of the invention.

FIG. 8 is a schematic cross-sectional view of an LCD panel according to another embodiment of the invention. Referring to FIG. 8, the LCD panel 700 includes the active device array substrate 600, an opposite substrate 710, and a liquid crystal layer 520, wherein the liquid crystal layer 520 is sandwiched between the active device array substrate 600 and the opposite substrate 710.

In an embodiment, the LCD panel 700 includes a sealant 530 disposed between the active device array substrate 600 and the opposite substrate 710, and surrounding the light shading structure 200b. Particularly, the light shading structure 200b has at least one channel 222, shown in FIGS. 2A-2C, and FIG. 3. Moreover, the opposite substrate 710 includes a substrate 712 and a common electrode 714 disposed on the substrate 712.

In the above process for forming the LCD panel 700, the active device array substrate 600 will be disposed with the sealant 530, and injected with liquid crystals to form the liquid crystal layer 520, and combined with the opposite substrate 710, etc, such that the LCD panel 700 is obtained. As described in the above LCD panel 500, the light shading structure 200b can be used to ease the light leakage at the edge of the display region 300a, and to slow down the flow speed of the liquid crystals, so that the contamination caused by the contact of the liquid crystal and the un-solidified sealant 530 can be avoided.

In summary, the light shading structure, the color filter substrate, the active device array substrate, and the LCD panel provided by the invention have at least the following advantages:

(1) A light shading layer is disposed on the black matrix layer of the non-display region adjacent to the edge of the display region, thus the light shading effect of the black matrix of the non-display region can be enhanced. That is, the phenomenon of light leakage will not easily occur at the edge of the LCD panel manufactured by using a color filter substrate or an active device array substrate with the light shading structure.

(2) The light shading structure has a multi-layer film and a plurality of channels. When an LCD panel is manufactured by using a color filter substrate or an active device array substrate with the light shading structure, the liquid crystals will be guided into the channel, and the flowing of liquid crystal will be hindered by the light shading structure, so the time taken by the liquid crystal to diffuse to the sealant will be prolonged. Therefore, there is sufficient time for the sealant to become solidified, so that liquid crystals will not be in contact with the un-solidified sealant, and the liquid crystals are prevented from being contaminated.

(3) Additional processes and masks are not required for manufacturing the light shading structure, the color filter substrate, the active device array substrate, and the LCD panel provided by the invention, so the manufacturing cost will not be increased.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A color filter substrate, comprising:
   a substrate, having a display region and a non-display region;
   a light shading structure, disposed on the substrate, and comprising:
      a black matrix layer, disposed on the substrate, and used for defining a plurality of sub-pixel regions in the display region and covering the non-display region adjacent to the edge of the display region;
      a light shading layer, disposed on the black matrix layer of the non-display region adjacent to the edge of the display region, wherein the light shading layer has at least one channel and at least one terminal of the channel has an opening; and
   a plurality of color filter units, correspondingly disposed in the sub-pixel regions.

2. The color filter substrate as claimed in claim 1, wherein the material of the light shading layer is selected from the group consisting of red photoresist, green photoresist, blue photoresist and a combination thereof.

3. The color filter substrate as claimed in claim 1, wherein the material of the black matrix layer includes resin.

4. The color filter substrate as claimed in claim 1, wherein the light shading layer comprises:
   a first light shading layer;
   a second light shading layer, disposed on the first light shading layer; and
   a third light shading layer, disposed on the second light shading layer.

5. The color filter substrate as claimed in claim 1, further comprising a common electrode disposed on parts of the light shading structure and the color filter units.

6. A liquid crystal display (LCD) panel, comprising:
   a color filter substrate as claimed in claim 1;
   an active device array substrate; and
   a liquid crystal layer, sandwiched between the color filter substrate and the active device array substrate.

7. The LCD panel as claimed in claim 6, further comprising a sealant, located between the color filter substrate and the active device array substrate and surrounding the light shading structure.

8. An active device array substrate, comprising:
   a substrate, having a display region and a non-display region;
   a plurality of scan lines and data lines, disposed in the display region;
   a plurality of active devices, disposed in the display region on the substrate, wherein each active device is electrically connected with one of the scan lines and one of the data lines;
   a plurality of pixel electrodes, disposed in the display region on the substrate, wherein each pixel electrode is respectively electrically connected with one of the active devices;
   a light shading structure, disposed on the substrate, and comprising:
      a black matrix layer, disposed on the substrate, and used for defining a plurality of sub-pixel regions in the display region and covering the non-display region adjacent to the edge of the display region;
      a light shading layer, disposed on the black matrix layer of the non-display region adjacent to the edge of the display region, wherein the light shading layer has at least one channel and at least one terminal of the channel has an opening; and
   a plurality of color filter units, correspondingly disposed in the sub-pixel regions.

9. The active device array substrate as claimed in claim 8, wherein the material of the light shading layer is selected from the group consisting of red photoresist, green photoresist, blue photoresist and a combination thereof.

10. The active device array substrate as claimed in claim 8, wherein the material of the black matrix layer includes resin.

11. The active device array substrate as claimed in claim 8, wherein the light shading layer comprises:
   a first light shading layer;
   a second light shading layer, disposed on the first light shading layer; and
   a third light shading layer, disposed on the second light shading layer.

12. A liquid crystal display (LCD) panel, comprising:
   an active device array substrate as claimed in claim 8;
   an opposite substrate; and
   a liquid crystal layer, sandwiched between the active device array substrate and the opposite substrate.

13. The LCD panel as claimed in claim 12, further comprising a sealant, located between the active device array substrate and the opposite substrate and surrounding the light shading structure.

* * * * *